United States Patent
Choi et al.

(10) Patent No.: US 6,490,079 B2
(45) Date of Patent: Dec. 3, 2002

(54) DEVICE FOR SUPPRESSING TRANSIENT EFFECT OF OPTICAL FIBER AMPLIFIER IN WDM SYSTEM

(75) Inventors: Doe-In Choi, Seoul (KR); Hong-Seok Shin, Songnam-shi (KR)

(73) Assignee: Samsung Electronic Co., LTD, Suwon (KR)

(*) Notice: Subject to any disclaimer, the term of this patent is extended or adjusted under 35 U.S.C. 154(b) by 0 days.

(21) Appl. No.: 09/780,631

(22) Filed: Feb. 9, 2001

(65) Prior Publication Data

US 2001/0012148 A1 Aug. 9, 2001

(30) Foreign Application Priority Data

Feb. 9, 2000 (KR) .......................................... 2000-5903

(51) Int. Cl.[7] .............................................. H04B 10/12
(52) U.S. Cl. ................................ 359/341.4; 359/337.11
(58) Field of Search ........................ 359/341.4, 341.41, 359/341.42, 341.43, 341.44, 194

(56) References Cited

U.S. PATENT DOCUMENTS

| | | | |
|---|---|---|---|
| 5,218,608 A | | 6/1993 | Aoki ............................. 372/6 |
| 5,245,690 A | | 9/1993 | Aida et al. .................. 385/142 |
| 5,307,196 A | * | 4/1994 | Kinoshita .................... 327/63 |
| 5,467,218 A | | 11/1995 | Takeda et al. .............. 359/341 |
| 5,467,219 A | * | 11/1995 | Ushirozawa ................ 359/174 |
| 5,485,299 A | * | 1/1996 | Jones .......................... 359/160 |
| 5,539,570 A | * | 7/1996 | Ushirozawa ................ 359/177 |
| 5,546,221 A | * | 8/1996 | Harasawa ................... 359/187 |
| 5,552,919 A | * | 9/1996 | Majima et al. ............. 359/110 |
| 5,617,240 A | * | 4/1997 | Hergault et al. ........... 359/161 |
| 5,680,246 A | * | 10/1997 | Takahashi et al. .......... 359/160 |
| 5,784,192 A | * | 7/1998 | Sugiyama et al. .......... 359/143 |
| 5,812,030 A | * | 9/1998 | Inami et al. ............. 250/214 A |
| 5,812,710 A | * | 9/1998 | Sugaya ....................... 359/127 |
| 5,838,488 A | * | 11/1998 | Kobayashi .................. 359/124 |
| 5,892,616 A | * | 4/1999 | Takahashi ................... 359/177 |
| 6,031,660 A | * | 2/2000 | Park et al. .................. 359/124 |
| 6,034,802 A | * | 3/2000 | Feng ...................... 250/214 C |
| 6,064,501 A | * | 5/2000 | Roberts et al. ............. 359/110 |
| 6,166,850 A | * | 12/2000 | Roberts et al. ............. 359/124 |
| 6,215,583 B1 | * | 4/2001 | Lagerstrom et al. ....... 359/124 |
| 6,243,183 B1 | * | 6/2001 | Enfors et al. ............... 359/189 |
| 6,246,514 B1 | * | 6/2001 | Bonnedal et al. .......... 359/124 |
| 6,304,371 B1 | * | 10/2001 | Sugiya et al. ............ 359/341.4 |
| 6,356,386 B1 | * | 3/2002 | Denkin et al. ............. 359/124 |
| 6,366,393 B1 | * | 4/2002 | Feulner et al. ............. 359/337 |
| 6,366,395 B1 | * | 4/2002 | Drake et al. ............... 359/337 |
| 6,377,394 B1 | * | 4/2002 | Drake et al. ............. 359/337.4 |

* cited by examiner

Primary Examiner—Thomas H. Tarcza
Assistant Examiner—Andrew R. Sommer
(74) Attorney, Agent, or Firm—Cha & Reiter

(57) ABSTRACT

A device for suppressing the transient effect of an optical fiber amplifier in a WDM system includes an input sensor which converts an input optical signal to an electrical signal; a transient effect suppresser for holding the electrical signal received from the input sensor for a predetermined time and for outputting the delayed signal in the form of pulses that are proportional to the variation of the number of channels; a voltage comparator for comparing the predetermined reference voltages with the amplitude of the pulses received from the transient effect suppresser and for outputting a trigger signal when the channel number is changed; a pump laser diode driver for supplying a driving voltage to a pump laser diode in response to the received pump indication signal; and, a controller for outputting the pump indication signal corresponding to the changed channel number in response to the trigger signal.

9 Claims, 2 Drawing Sheets

DEVICE FOR SUPPRESSING TRANSIENT EFFECT OF OPTICAL FIBER AMPLIFIER IN WDM SYSTEM

BACKGROUND OF THE INVENTION

1. Field of the Invention

The present invention relates generally to optical communication in a Wavelength Division Multiplexing (WDM) system, and in particular, to a device for suppressing the transient effect caused by the increased or decreased number of connections in the optical system.

2. Description of the Related Art

Wavelength-division multiplexing (WDM) combines signals at different wavelengths to travel through the same fiber. The WDM has become important as it can multiply the transmission capacity of a single fiber without the installation of a new cable.

In fiber amplifiers, an optical fiber is the amplifying medium where stimulated emission takes place, yield a stronger optical signal. The WDM system is provided with an optical fiber amplifier for amplifying an optical signal without the need for opto-electrical conversion. The optical fiber amplifier amplifies an optical signal relying on the amplification of a rare-earth (e.g., erbium) element doped fiber, which is disclosed in detail in U.S. Pat. Nos. 5,218,608, 5,245,690, and 5,467,218. However, the conventional amplifiers have some drawbacks of a decreased output level and deteriorated S/N (signal-to-noise) ratio. Thus, it is necessary to monitor the number of channels, the output power level, and the SNR (Signal-to-Noise Ratio) of channels during the transmission of light signals in the WDM system.

Accordingly, the transient effect of remaining channels resulting from the on/off or add/drop of channels in the fiber amplifier affects the reliable operation of the system and also deteriorates the transmission quality of an optical signal. For example, in the event that 8-channels are dropped in the 16-channel transmitting WDM system, the optical fiber amplifier increases the output power per channel above a reference output power level in order to maintain the total output power of 16 channels; thus, the transient phenomenon generates overshoot or undershoot of the output power in the system.

The transient effect described in the preceding paragraphs can be suppressed by modifying the optical structure of the optical fiber amplifier, or controlling the light intensity of the pump laser diode. The former optical approach is effective in suppressing the transient effect but has drawbacks in that the optical system and the circuit for controlling the optical amplifier are complicated. In the latter approach, the transient effect of a single channel or a few channels can be suppressed, but it is not effective where a large number of channels is changed abruptly.

SUMMARY OF THE INVENTION

It is, therefore, an object of the present invention to provide a device for suppressing the transient effect of an optical fiber amplifier caused by a channel on/off or channel add/drop in order to prevent the deterioration of the transmission quality of an optical signal in the WDM system.

It is another object of the present invention to provide a device for suppressing the transient effect of an optical fiber amplifier by appropriately controlling the gain of the optical fiber amplifier when a large number of channels is changed in a WDM system.

Accordingly, a device for suppressing the transient effect of an optical fiber amplifier in a WDM system includes an input sensor that converts an input optical signal to an electrical signal; a transient effect suppresser for holding the electrical signal received from the input sensor for a predetermined time and for outputting the delayed signal in the form of pulses that are proportional to the variation of the number of channels; a voltage comparator for comparing the predetermined reference voltages with the amplitude of the pulses received from the transient effect suppresser and for outputting a trigger signal when the channel number is changed; a pump laser diode driver for supplying a driving voltage to a pump laser diode in response to the received pump indication signal; and, a controller for outputting the pump indication signal corresponding to the changed channel number in response to the trigger signal.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail as they would obscure the invention in unnecessary detail.

Figure 1:
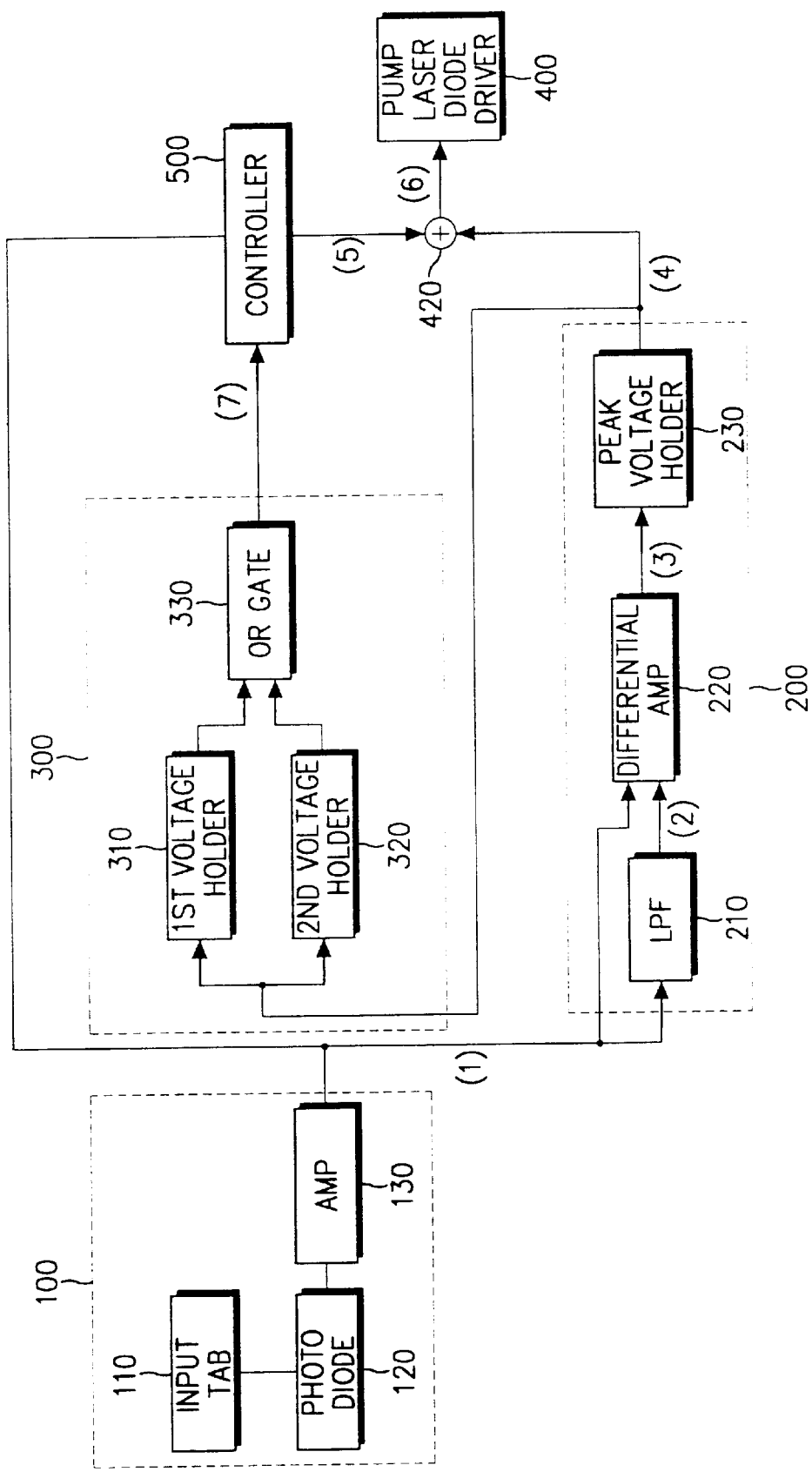
FIG. 1 is a block diagram of a device for suppressing the transient effect of an optical fiber amplifier in a WDM system according to a preferred embodiment of the present invention; and, FIG. 2 is a diagram illustrating waveforms in the transient effect for the suppressing device according to the preferred embodiment of the present invention.

Referring to FIG. 1, a transient-effect suppressing device according to the preferred embodiment of the present invention includes an input sensor 100, a transient effect suppresser 200, a voltage comparator 300, a pump laser diode driver 400, and a controller 500. A detailed description of the major components of the device is described herein below.

1. Input Sensor

The function of the input sensor 100 is to convert optical signals applied to the input of the optical fiber amplifier to electrical signals. The input sensor 100 includes an input tab 110, a photo diode 120, and an amplifier 130.

The input tab 110 serves to separate a portion of the input optical signal at a predetermined ratio. The photo diode 120 converts the optical signal incident from the input tab 110 to an electrical signal, and the amplifier 130 amplifies the converted electrical signal.

2. Transient Effect Suppresser

The transient effect suppresser 200 holds the output of the input sensor 100 for a predetermined time and outputs it in the form of pulses in proportion to the variation of the number of channels. The transient effect suppresser 200 includes a low pass filter (LPF) 210, a differential amplifier 220, and a peak voltage holder 230.

The LPF 210 delays the electrical signal received from the input sensor 100 to produce a temporal difference with the output of the photo diode 120 when the input electrical signal is significantly changed due to a large variation in the number of channels.

The differential amplifier 220 outputs signal pulses that are proportional to the voltage difference between the electrical signal received from the input sensor 100 and the electrical signal received from the LPF 210. Here, there is a little difference between the outputs of the photo diode 120 and the LPF 210 before the number of channels is changed drastically. Therefore, the output of the differential amplifier 220 is maintained at almost zero. On the other hand, if the number of channels is changed significantly, a temporal difference is produced between the outputs of the photo diode 120 and the LPF 210 due to the time delay of the LPF 210. Hence, the output of the differential amplifier 220 takes the form of pulses of amplitudes that is proportional to the variation in the number of channels.

The peak voltage holder 230 holds the pulses received from the differential amplifier 220 for a predetermined time. The peak voltage holder 230 functions to suppress the transient effect until the controller 500 is activated to initiate the control operation. Thus, the suppression duration is controllable according to the operation by the controller 500.

3. Voltage Comparator

The voltage comparator 300 compares a predetermined reference voltage with the amplitude of pulses received from the transient effect suppresser 200 and outputs a trigger signal when the channel number is changed. The voltage comparator 300 includes a first voltage comparator 310, a second voltage comparator 320, and an OR gate 330.

The first voltage comparator 310 compares the pulse amplitude with a predetermined positive reference-voltage for overshoot of the optical power level and outputs a voltage comparison value. The second voltage comparator 320 compares the pulse amplitude with a predetermined negative reference-voltage for undershoot of the optical power level and outputs a voltage comparison value. Hence, the absolute value of the positive and negative reference-voltages is equivalent to the lowest light intensity of a channel applicable to the input of the optical fiber amplifier.

The OR gate 330 notifies the controller 500 of the change in the channel number by outputting a trigger signal when at least one of the first and second voltage comparators 310 and 320 output a trigger-on signal.

4. Pump Laser Diode Driver

The pump laser diode driver 400 supplies a driving voltage to a pump laser diode coupled to the optical fiber amplifier in response to the pump indication signal received from the controller 500.

5. Controller

The controller 500 outputs a pump indication signal corresponding to the changed channel number to the pump laser diode driver 400 in response to the trigger signal received from the voltage comparator 300. When the controller 500 responses to control the optical power level in response to the variation in the channel number, the controller 500 outputs the pump indication signal proportional to the change in the number of channels at the time of discharge in the peak voltage holder 230, to achieve a constant gain for the optical amplifier. Although the transient effect occurs due to a variation in the number of channels in the system, the transient effect suppresser 200 can immediately suppressed the transient effect through control operation to obtain a constant gain for the amplifier. Thus, the controller 500 can prevent the transient effect that may overshoot and undershoot the input optical signals.

Figure 2:
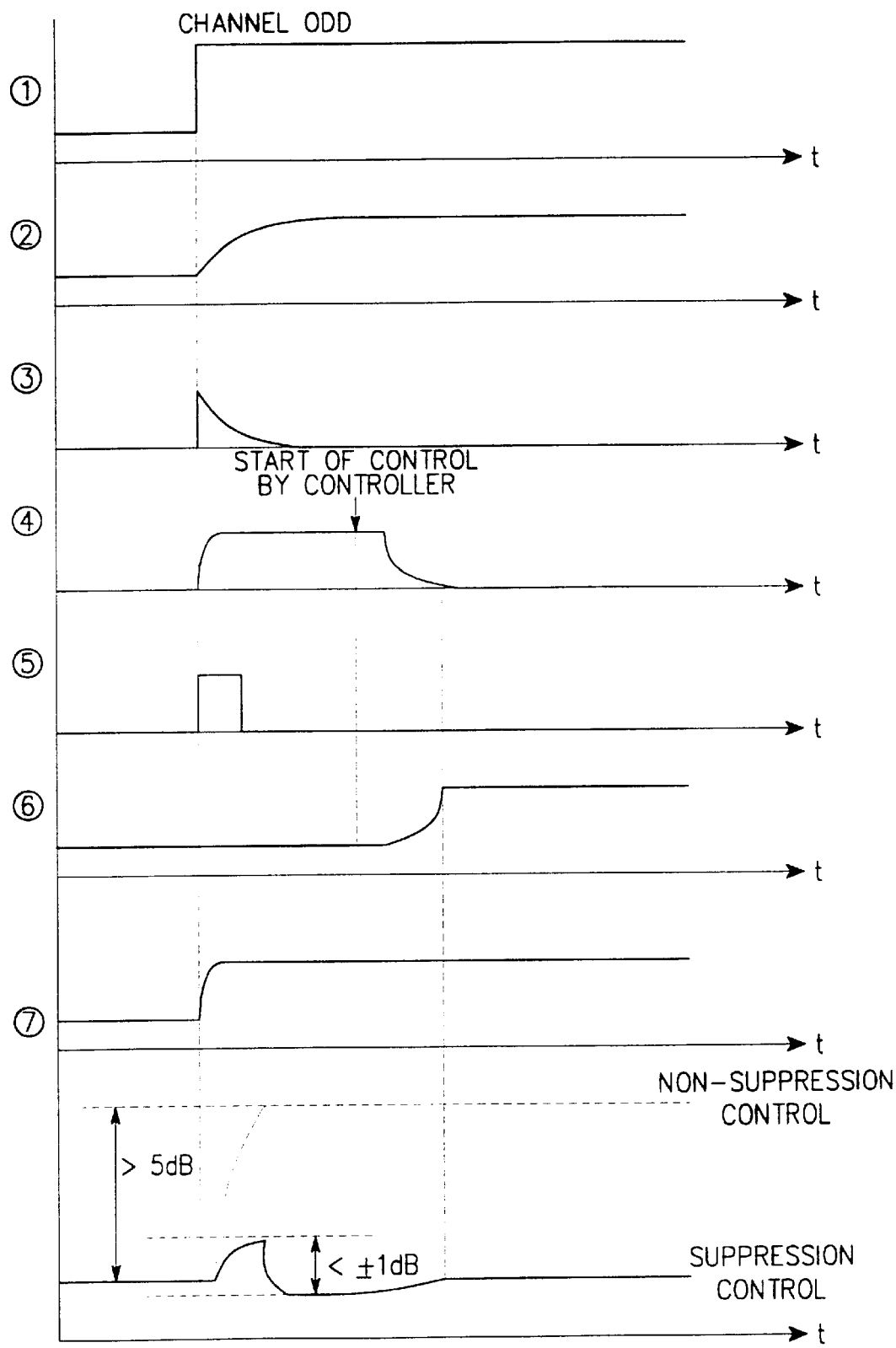

FIG. 2 illustrates the waveforms during different stages in the transient effect suppressing device according to the preferred embodiment of the present invention. Reference numerals (1) through (7) shown in FIG. 2 denote output signals in the respective components of the inventive device, and they are indicated by the same numerals in FIG. 1. As noted from FIG. 2, when the number of channels is drastically increased, the transient effect is suppressed by the inventive device. The waveform represented by (7) indicates two scenarios: the top represents a scenario where no control is performed and the bottom represents the waveform according to the suppression control performed by the present invention. Accordingly, the overshoot and undershoot of the remaining channels in response to a variation in the channel number are shown to be suppressed to ±1 dB or below.

As described above, the transient-effect suppressing device of the present invention senses a variation in the number of channels caused by the on/off channels or add/drop channels and performs an appropriate output control, thereby preventing the deterioration of optical transmission quality. Furthermore, as the transient-effect suppressing device can prevent the transient effect of remaining channels with the use of relatively simple circuits, it contributes to satisfy the demands of miniaturization and low price.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A device for suppressing the transient effect of an optical fiber amplifier in a WDM system, comprising:

an input sensor for converting an input optical signal to an electrical signal;

a transient effect suppresser for delaying the electrical signal received from the input sensor for a predetermined time and for outputting the delayed signal in the form of pulses proportional to a channel variation in the system;

a voltage comparator for comparing a predetermined reference voltage with the amplitude of the pulses received from the transient effect suppresser and for outputting a trigger signal if the channel variation is detected;

a pump laser-diode driver for supplying a driving voltage to a pump laser diode in response to the received pump indication signal; and, a controller for outputting the pump indication signal according to the channel variation in response to the trigger signal.

2. The device of claim 1, wherein the input sensor comprises:

an input tab for separating a portion of the input signal at a predetermined ratio;

a photo diode for converting the optical signal incident from the input tab to an electrical signal; and, an amplifier for amplifying the electrical signal received from the photo diode.

3. The device of claim 1, wherein the transient effect suppresser comprises:

a low pass filter for delaying the electrical signal received from the input sensor and for outputting the delayed signal;

a differential amplifier for outputting the pulses of an amplitude proportional to the voltage difference between the electrical signal received from the input sensor and the electrical signal received from the low pass filter; and, a peak voltage holder for holding the pulses received from the differential amplifier for a predetermined time and for outputting the delayed pulses.

4. The device of claim 1, wherein the voltage comparator comprises:

a first voltage comparator for comparing the amplitude of the input pulses with a predetermined positive reference voltage;

a second voltage comparator for comparing the amplitude of the input pulses with a predetermined negative reference voltage; and, an OR gate for outputting the trigger signal if a difference between the output of the first and second voltage comparators is detected.

5. The device of claim 4, wherein the absolute value of the positive and negative reference voltages is equivalent to the lowest light intensity of a channel applicable to the input of the optical fiber amplifier.

6. A device for suppressing the transient effect of an optical fiber amplifier in a WDM system, comprising:

an input tab for separating a portion of the input signal at a predetermined ratio;

a photo diode for converting the optical signal incident from the input tab to an electrical signal;

an amplifier for amplifying the electrical signal received from the photo diode;

a low pass filter for delaying the electrical signal received from the amplifier and for outputting a delayed signal;

a differential amplifier for outputting the pulses of an amplitude that are proportional to the voltage difference between the electrical signal received from the amplifier and the electrical signal received from the low pass filter;

a peak voltage holder for holding the pulses received from the differential amplifier for a predetermined time and for outputting the delayed pulses;

a first voltage comparator for comparing the amplitude of the pulses received from the differential amplifier with a predetermined positive reference voltage;

a second voltage comparator for comparing the amplitude of the pulses received from the differential amplifier with a predetermined negative reference voltage;

an OR gate for outputting a trigger signal if a difference between the output of the first and second voltage comparators is detected;

a pump laser diode driver for supplying a driving voltage to a pump laser diode in response to a received pump indication signal; and, a controller for outputting the pump indication signal according to the channel variation in the system in response to the trigger signal.

7. A device for suppressing the transient effect of an optical fiber amplifier in a WDM system, comprising:

an input sensor for converting an input optical signal to an electrical signal;

a transient effect suppresser for delaying the electrical signal received from the input sensor for a predetermined time and for outputting the delayed signal in the form of pulses proportional to a channel variation in the system;

a voltage comparator for comparing a predetermined reference voltage with the amplitude of the pulses received from the transient effect suppresser and for outputting a trigger signal if the channel variation is detected;

a pump laser-diode driver for supplying a driving voltage to a pump laser diode in response to the received pump indication signal; and, a controller for outputting the pump indication signal according to the channel variation in response to the trigger signal, wherein the absolute value of the positive and negative reference voltages is equivalent to the lowest light intensity of a channel applicable to the input of the optical fiber amplifier.

8. The device of claim 7, wherein the transient effect suppresser comprises:

a low pass filter for delaying the electrical signal received from the input sensor and for outputting the delayed signal;

a differential amplifier for outputting the pulses of an amplitude proportional to the voltage difference between the electrical signal received from the input sensor and the electrical signal received from the low pass filter; and, a peak voltage holder for holding the pulses received from the differential amplifier for a predetermined time and for outputting the delayed pulses.

9. The device of claim 7, wherein the voltage comparator comprises:

a first voltage comparator for comparing the amplitude of the input pulses with a predetermined positive reference voltage;

a second voltage comparator for comparing the amplitude of the input pulses with a predetermined negative reference voltage; and, an OR gate for outputting the trigger signal if a difference between the output of the first and second voltage comparators is detected.

* * * * *